United States Patent [19]

Hewitt

[11] 4,192,559
[45] Mar. 11, 1980

[54] ROTARY UNION

[75] Inventor: William Hewitt, Bel Air, Md.

[73] Assignee: Koppers Company, Inc., Pittsburgh, Pa.

[21] Appl. No.: 900,919

[22] Filed: Apr. 28, 1978

[51] Int. Cl.² .............................................. F16C 17/02
[52] U.S. Cl. .................................. 308/36.1; 308/121
[58] Field of Search ....................... 308/36.1, 121, 122, 308/187, 37, 36.2

[56] References Cited

U.S. PATENT DOCUMENTS

| 3,411,706 | 11/1968 | Woollenweber | 308/121 |
| 3,934,952 | 1/1976 | Gardner | 308/36.1 |
| 3,945,693 | 3/1976 | Booth | 308/36.1 |
| 3,971,603 | 7/1976 | Bjerk | 308/122 |

Primary Examiner—Lenard A. Footland
Attorney, Agent, or Firm—Thomas L. Sivak; Oscar B. Brumback

[57] ABSTRACT

A rotary union comprised of housing defining a generally cylindrical chamber, a rotatable shaft, a plurality of stationary bearings and an end cap. The cylindrical chamber is open at one end. The housing has an inlet port and an outlet port through the housing in communication with the chamber. The chamber has a shaft rotatably mounted therein on stationary bearings contained within the chamber. The rotating shaft has a port axially spaced to be in line with the inlet port in the housing to receive a fluid with lubricating capacity. The fluid is conducted through the shaft by way of a second port to a rotating element which the shaft is suitably affixed. The fluid is allowed to seep within the union, thereby providing a lubricating function. The shaft, also, has a plurality of drain ports in communication with the outlet port in the housing to permit discharge of seepage fluid. An end cap preceded by a shim is placed in the chamber opening, enclosing the opening. The end cap, when tightened, adjusts certain clearances between elements within the rotating union such that certain fluid seepage paths ae modified.

7 Claims, 2 Drawing Figures

ROTARY UNION

BACKGROUND OF THE INVENTION

This invention applies to rotating joints or unions connected to a rotating element wherein fluid is passed through the joint to the rotating element. More particularly, to rotating joints used to conduct fluids with lubricating capacity to rotating elements.

Rotary unions are used in apparatus to introduce a viscous substance into a rotating element, for example, in expandable shaft systems. The functional assignment of rotary union in expandable shaft systems is typical of other systems employing rotary unions. Expandable shafts are generally designed such that cutting elements carried by the shaft are secured in place when a fluid is conducted into the shaft under pressure, thereby causing the shaft to expand, locking the elements in place. As the expandable shaft is rotated, a material usually in sheet form, for example, corrugated board, is passed over the shaft, whereupon the cutting elements cut the material. Rotary unions are used in expandable shaft systems as a means by which pressure influenced fluid is admitted to the shaft. The shaft expansion is very slight, therefore, the rotary union must be able to maintain a constant feed such that the pressure can be continuously monitored and adjusted to compensate for any system leakage which may occur while the shaft is rotating.

Rotary unions generally employ a housing which defines a cylindrical chamber and a rotatable shaft, rotatably mounted within the chamber. The rotating shaft is designed to receive and conduct fluids to a rotating element which is suitably attached to the rotating shaft. Rotary unions are usually an integral component in a system or sub-system. Therefore, the necessity of repairing or replacing the rotary union will require system shutdown resulting in the loss of system productivity. The primary cause of rotary union failure is wearing of union internal elements due to the presence of several moving elements within the union, for example, bearings and sealing rings. Generally, the more moving elements a component or apparatus has, the more susceptible the apparatus to wear failure, especially when the elements are subjected to high speed motion for prolonged periods of time. Rotary unions are extremely vulnerable to wear, especially when deployed in high speed industrial machinery. A complementary factor in the promotion of wear is the presence of heat. Available rotary unions provide no means by which heat due to friction can be dissipated.

The presence of a lubricant acts to minimize wear; however, under extreme operating conditions such as those existing in industry, the prolonged exposure of a lubricant to heat (friction-generated heat in the case of the rotary unions) causes the lubricant to first thin and then decompose. As a result of lubricant decomposition, unions must receive frequent replenishment of lubricant which requires system shutdown resulting in loss of system productivity.

The present invention provides a rotary union with a longer operating life during which minimum servicing is required.

SUMMARY OF THE INVENTION

A rotary union comprised of a housing defining a generally cylindrical chamber, a plurality of stationary bearings, a rotating shaft and an end cap. The housing has an inlet and outlet port contained therein in communication with the chamber. The rotating shaft is supported within the chamber by a plurality of stationary bearings. The rotating shaft has a port in line with the inlet port in the housing to receive pressure influenced fluid with lubricating capacity. The fluid is conducted through the shaft by way of a second port to a rotating element which the shaft is suitably affixed. The fluid is allowed to seep within the union and journey between shaft interfaces with other union components, thereby providing a lubricating function. The shaft, also, has a plurality of drain ports in communication with the outlet port in the housing to permit discharge of seepage fluid. The discharged fluid carries with it any excess heat present within the union. A shim is placed between the end cap and housing such that adjustment of the end cap alters the clearance between the internal elements to modify the pressure drop across the union, i.e., between housing inlet and outlet ports.

DETAILED DESCRIPTION OF THE PREFERRED EMBODIMENT

Figure 1:
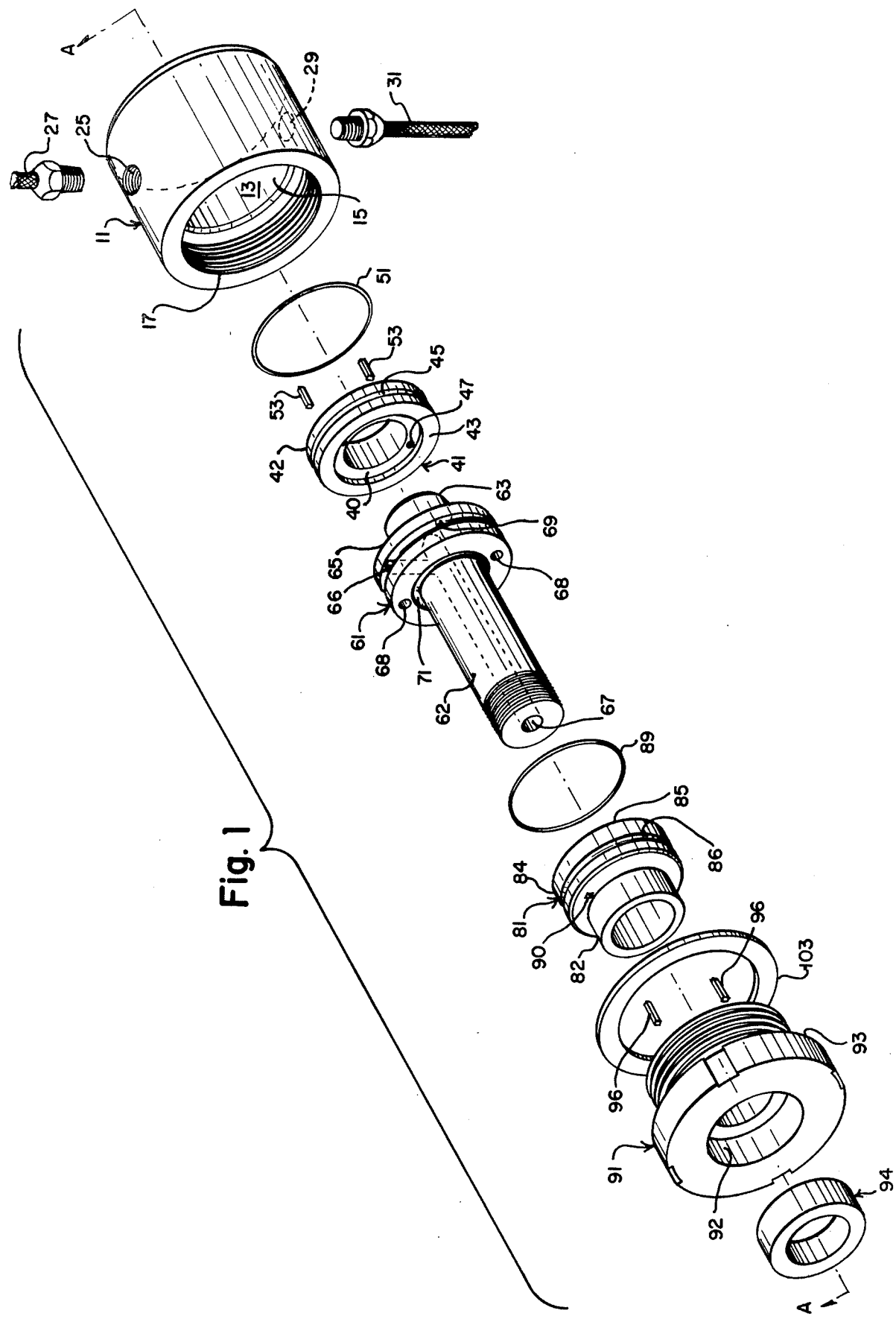
FIG. 1 is an exploded view of a rotary union.
Figure 2:
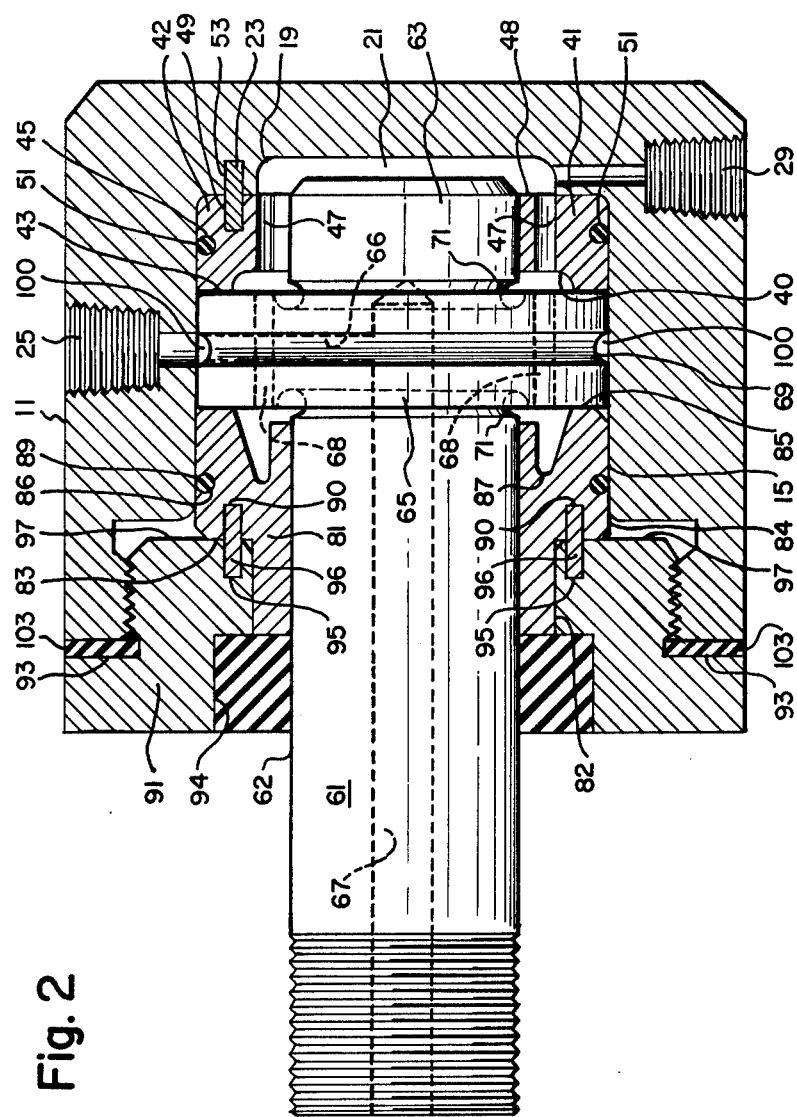
FIG. 2 is a sectional view along line A—A.

The rotary union as shown in FIGS. 1 and 2 is comprised of a housing 11 defining an open end chamber 13. The chamber wall 15 is threaded in the proximity of the chamber opening 17. The chamber end wall 19 has a recess 21 which is generally circular. The end wall 19 also has slots 23 contained therein. There is a high pressure fluid inlet port 25 extending through the housing in communication with chamber 13. There is also an outlet bypass drain port 29 extending through the housing 11 in communication with the end wall recess 21. The high pressure inlet port 25 and the drain port 29 have threaded openings such that a feed line 27 can be screwably attached to port 25 and a drain line 31 can be screwably attached to drain port 29.

A first stationary bearing 41 of length a is inserted into the chamber 13. The stationary bearing 41 has a rim 43 around its forward face 40. There is a groove 45 which travels centrally around the outer circumferential surface 42 of the stationary bearing 41. Two bypass drain ports 47 extend axially throughout the stationary bearing 41. The bypass ports 47 are diametrically across from each other, each placed and extending an equal distance from the geometric center of the bearing 41. The distance between the ports 47 is less than the diameter of the end wall recess 21 such that ports 47 provide an access route through bearing 41 to the recess 21. The rear surface 48 of the stationary bearing 41 contains two slots 49. Prior to the introduction of bearing 41 into chamber 13, two pins 53 are placed in slots 49, and an O-ring 51 sized to closely fit within groove 45 is thereinto placed. Thereafter, bearing 41 is inserted into chamber 13 such that the pins 53 will lodge in slots 23 contained in the chamber end wall 19. The radius of bearing 41 is sized to be admitted into and closely fit within chamber 13. The O-ring 51 forms a seal such that fluid cannot seep aft, towards the end wall 19, of O-ring 51 between the chamber wall 13 and bearing surface 42. The pins 53 refrain the bearing 41 from rotating during union operation. Stationary bearing 41 is a unitary component made of a suitable material with a hole at its center as is hereafter described bearing 81.

A rotatable shaft 61 having sections 62, 63, and 65 is next inserted in chamber 13. Each section 62, 63, and 65 of shaft 61 has a generally cylindrical configuration about a colinear centerlines. The radius of shaft section 65 is approximately equal to the radius of the stationary bearing 41. The radius of the cylinder shaft section 62 and 63 are chosen such that they pass through and closely fit within the stationary bearings 41 and 81, bearing 81 to be described hereinafter. The radius of shaft section 62 is a matter of choice to be based on the rotating element, not shown, to be attached thereto, limited by the ability of the shaft section 62 to pass through stationary bearing 81 and end cap 91, to be described subsequently. Section 62 is threaded to facilitate its attachment to a rotating element, not shown.

The rotating shaft 61 houses a high pressure inlet port 66 and a high pressure outlet port 67. The high pressure outlet port 67 extends axially along the geometric center of shaft 61 from shaft section 65 throughout shaft section 62. The high pressure inlet port 66 extends radially from the geometric center of shaft 61 to the external surface of shaft section 65. The high pressure inlet port 66 and the high pressure outlet port 67 are in direct communication with one another. Inlet port 66 is positioned in shaft section 65 opposite inlet port 25 in the housing 11. A groove 69 is centrally placed around shaft section 65. Groove 69 intercepts the opening of inlet port 66.

Shaft section 65 has a plurality of bypass drain ports 68 extending axially throughout shaft section 65 placed diametrically opposite to one another and spaced an equal distance from the geometric center of section 65 such that the bypass drain ports 68 are aligned colinear with ports 47. Shaft 61 has grooves 71 located between the intersection of sections 62, 65 and sections 65, 63. The rotatable shaft 61 is inserted into the chamber 13 with shaft section 63 rotatably mounted within stationary bearing 41.

A second stationary bearing 81 is next inserted in chamber 13. Stationary bearing 81 is comprised of sections 82 and 84. A groove 86 is centrally placed around bearing section 84. A generally circular route 87 is contained on the face 85 of bearing 81. The radius of route 87 is equal to radial displacement of ports 68 contained in shaft 61. A plurality of slots 90 are placed in bearing surface 83. Prior to the insertion of bearing 81, an O-ring 89 is placed in groove 86. The radius of bearing 81 is chosen to closely fit against the chamber wall 15 upon insertion of bearing 81 into chamber 15. The radius of bearing section 82 is chosen to permit section 82 to fit between shaft 61 and hereafter described end cap 91. The O-ring 89 prevents fluid from seeping forward of O-ring 89. The bearing 81 rotatably supports shaft section 62.

An end cap 91 is then screwably attached to housing 11 enclosing the chamber opening 17. The end cap 91 has a rim portion 93 and slots 95. The end cap 91 has a step decreasing radius hole 92 at its center which permits shaft section 62 to pass therethrough. Prior to the attachment of the end cap 91, pins 96 are placed in slots 95. The pins 96 extend to engage slots 90 contained in stationary bearing 81 to refrain bearing 81 from any rotational motion. A ring-shape oil seal 94 is placed with the end cap hole 92 to retard fluid seepage between the end cap 91 and shaft 61. The end cap 91 abuts bearing 81 along end cap surface 97 such that the end cap 91 places pressure on bearing 81. A shim 103 can be placed between the end cap rim 93 and the housing 11 such that the pressure exerted by the end cap on bearing 81 can be varied, thereby altering the clearances between shaft section 65 and bearings 41 and 81.

A pressure influenced fluid with lubricating capacity is channeled into the high pressure inlet port 25. The fluid is therefrom forced into a chamber 100 which is formed by the interrelationship of groove 69 and chamber wall 15. The fluid proceeds from chamber 100 to the high pressure inlet port 66 of the rotating shaft 61 advancing to the high pressure outlet port 67. The fluid then journeys to a rotating element (not shown) suitably attached to shaft 61.

Because the fluid within chamber 100 is pressure influenced, an appreciable amount of fluid seepage is derived between shaft section 64 and the chamber wall 15 adjacent thereto. The O-rings 51 and 89 retard seepage between the stationary bearings 41 and 81 and respective portions of chamber wall 15 adjacent thereto, requiring seeping fluid to journey between the stationary bearings 41 and 81, and shaft 61 interfaces. Route 87 in bearing 81 serves to collect and direct that portion of seepage between the shaft 61 and bearing 81 interfaces, directing the seepage to the bypass drain ports 68 housed by shaft section 65. That portion of seepage journeying throughout drain port 68 is united with the remaining fluid which has seeped between the shaft section 64 and bearing rim 43. Fluid is then directed through the bearing bypass drain ports 47 and between shaft section 65 and bearing 41 interface. The fluid is thereafter collected in the end wall recess wherefrom fluid is discharged through the drain port 29, whereupon the fluid can be collected and recycled. The grooves 71 in the rotor 61 permit proper sizing and alignment of the surfaces that assist in the fluid dynamics of the apparatus.

It is observed that the apparatus is continuously receiving and discharging fluid and thereby receiving continuous lubrication. The continuous discharge of lubricant performs the additional function of cooling the rotary unions.

I claim:

1. A rotary union for connection to a rotating element which rotates with respect to said union which comprises:
   (a) a housing defining a generally circular chamber;
   (b) inlet means for continuously receiving a pressure influenced fluid with lubricating capacity into said chamber;
   (c) a rotating shaft rotatably mounted in said chamber, said shaft being rotatably supported within said chamber, said shaft extending axially within said chamber and beyond said chamber, said rotating shaft having a first and second port which ports feed into each other, said first port aligned to receive said fluid from said inlet means, said second port aligned to discharge said fluid to said rotating element suitably affixed to said shaft;
   (d) support means stationarily mounted in said chamber, rotatably supporting said shaft;
   (e) lubricating means for continuously lubricating said rotating shaft and relieving said union of excess internal heat, said lubricating means to provide a flow passage for a portion of said fluid within said chamber between said shaft interfaced with said support means and said chamber wall, said lubricating means in communication with said inlet means, deriving a portion of said fluid from seepage between said inlet means and said first port;

(f) outlet means for continuously discharging that portion of said fluid utilized as a lubricant within said chamber, said outlet means in communication with said lubricating means; and (g) means for sealably enclosing said chamber and allowing said shaft to be attached to said rotating element.

2. A rotary union as claimed in claim 1 wherein said lubricating means comprises:

(a) a first passageway derived by the clearance between said rotating shaft and said chamber wall, and said rotating shaft and support means; and (b) means for communicating said first passageway with said outlet means.

3. A rotary union as claimed in claim 2 further comprising means to adjust the amount of said fluid utilized to lubricate said union, as well as vary the pressure from inlet to outlet.

4. A rotary union as claimed in claim 1 wherein said support means comprises:

(a) a plurality of bearings stationarily mounted in said chamber, said bearing having a groove around said bearing's outer surface and a hole at the center of each of said bearings, said bearings of a unitary cylindrical construction, sized to closely fit within said chamber; and (b) a plurality of O-rings, one of said O-rings placed around each of said bearings in said bearing groove, said O-rings sized to sealably engage said chamber wall and said bearing carrying said O-ring.

5. A rotary union which comprises:

(a) a housing defining a generally circular chamber open at one end having a side wall and end wall, said end wall having a generally circular recess;

(b) inlet means for continuously receiving a pressure influenced fluid with lubricating capacity and channeling said fluid to said chamber;

(c) a plurality of bearings stationarily mounted in said chamber, said bearings having a groove centrally positioned around said bearings' outer surface, said bearings have a hole at their center and are sized to closely fit within said chamber, each of said bearings of a unitary cylindrical construction;

(d) a plurality of O-rings, one of said O-rings placed in said bearing groove, said O-rings sized to sealably engage said chamber wall and said bearing;

(e) a rotating shaft rotatably mounted in said chamber, said shaft being rotatably supported within said chamber by said bearings, said shaft having a section of a radius to permit a close fit with said chamber wall, at least of one said bearings being positioned on either side of said shaft section, said shaft having a first and second port, said ports in communication with each other, said first port extending generally radially within said rotating shaft section, aligned to receive said fluid from said inlet means, said second port extending generally axially within said rotating shaft such that said fluid is discharged from said shaft portion extending beyond said chamber opening, said shaft section has a groove placed around said shaft section coaxially positioned with said first port;

(f) lubricating means for continuously lubricating said rotating shaft and relieving said union of excess internal heat, said lubricating means to provide a flow passage for a portion of said fluid, within said chamber between said shafts interfaces with said bearings and said chamber wall, said lubricating means in communication with said inlet means and said wall recess;

(g) outlet means for continuously discharging that portion of said fluid utilized as a lubricant within said chamber, said outlet means in communication with said end wall recess;

(h) an end cap with a hole at its center screwably mounted in said chamber opening, said end cap in contact with at least one of said bearings, said shaft extending through said end cap hole; and (i) sealing means between said end cap and said rotating shaft.

6. A rotary union as claimed in claim 5 wherein said lubricating means comprises:

(a) a first passageway derived by the clearance between said rotating shaft and said chamber wall, and said rotating shaft and said bearings;

(b) a second passageway within said shaft section extending axially throughout said shaft section; and (c) a third passageway contained in said bearings and axially extending throughout said bearings which are between said shaft section and said chamber end wall recess, said third passageway extending axially within said bearings and positioned radially from the center of said bearing equal distance with said second passageway, said third passageway directed to said end wall recess.

7. A rotary union as claimed in claim 5 wherein said rotary union further comprises:

(a) shim ring placed between said end cap on said housing.

* * * * *